United States Patent [19]

Spongr et al.

[11] Patent Number: 4,656,357
[45] Date of Patent: Apr. 7, 1987

[54] APPARATUS FOR MEASURING COATING THICKNESS

[75] Inventors: Jerry J. Spongr, Tonawanda; Byron E. Sawyer, North Tonawanda, both of N.Y.

[73] Assignee: Twin City International, Inc., Amherst, N.Y.

[21] Appl. No.: 723,885

[22] Filed: Apr. 16, 1985

[51] Int. Cl.⁴ ......................................... G01N 23/223
[52] U.S. Cl. ............................. 250/359.1; 250/360.1; 250/308; 378/89
[58] Field of Search ................ 250/308, 360.1, 359.1, 250/358.1, 491.1; 378/50, 89; 108/145, 146 (U.S. only)

[56] References Cited

U.S. PATENT DOCUMENTS 4,383,172  5/1983  Holler et al. ..................... 250/308
4,437,012  3/1984  Cavy et al. ..................... 250/491.1
4,451,732  5/1984  Spongr et al. ................... 250/308

FOREIGN PATENT DOCUMENTS 2113310  6/1972  France ........................... 378/50
 172206 10/1982  Japan ............................ 378/50

Primary Examiner—Janice A. Howell
Assistant Examiner—Constantine Hannaher
Attorney, Agent, or Firm—Christel, Bean & Linihan

[57] ABSTRACT

An apparatus for measuring the thickness of a coating on a continuously moving strip of material. The apparatus includes a frame (10), a shuttle (24) mounted on the frame for reciprocal movement thereon, an engaging pin (174) carried by the shuttle and capable of engaging the moving strip to cause the shuttle to be moved by the strip, a drive (120, 122, 118, 126, 116, 114, and 112) capable of moving the shuttle in a direction reverse to the movement of the strip, and measuring means, at least a portion of which is mounted on the shuttle. The apparatus further includes a support (172) mounted on the shuttle and capable of supporting the strip when the engaging pin is engaging the moving strip, and structure capable of adjusting the support (172) towards and away from the portion of the measuring means mounted on the shuttle to establish a predetermined spaced apart measuring distance. The drive means includes an improved connection between a drive chain (112) and the shuttle (24), the improved connection including a pair of pins (138), a saddle block (140), a reciprocal yoke (114) and a drive pin secured to the saddle block and rotatably journaled in the yoke.

16 Claims, 20 Drawing Figures

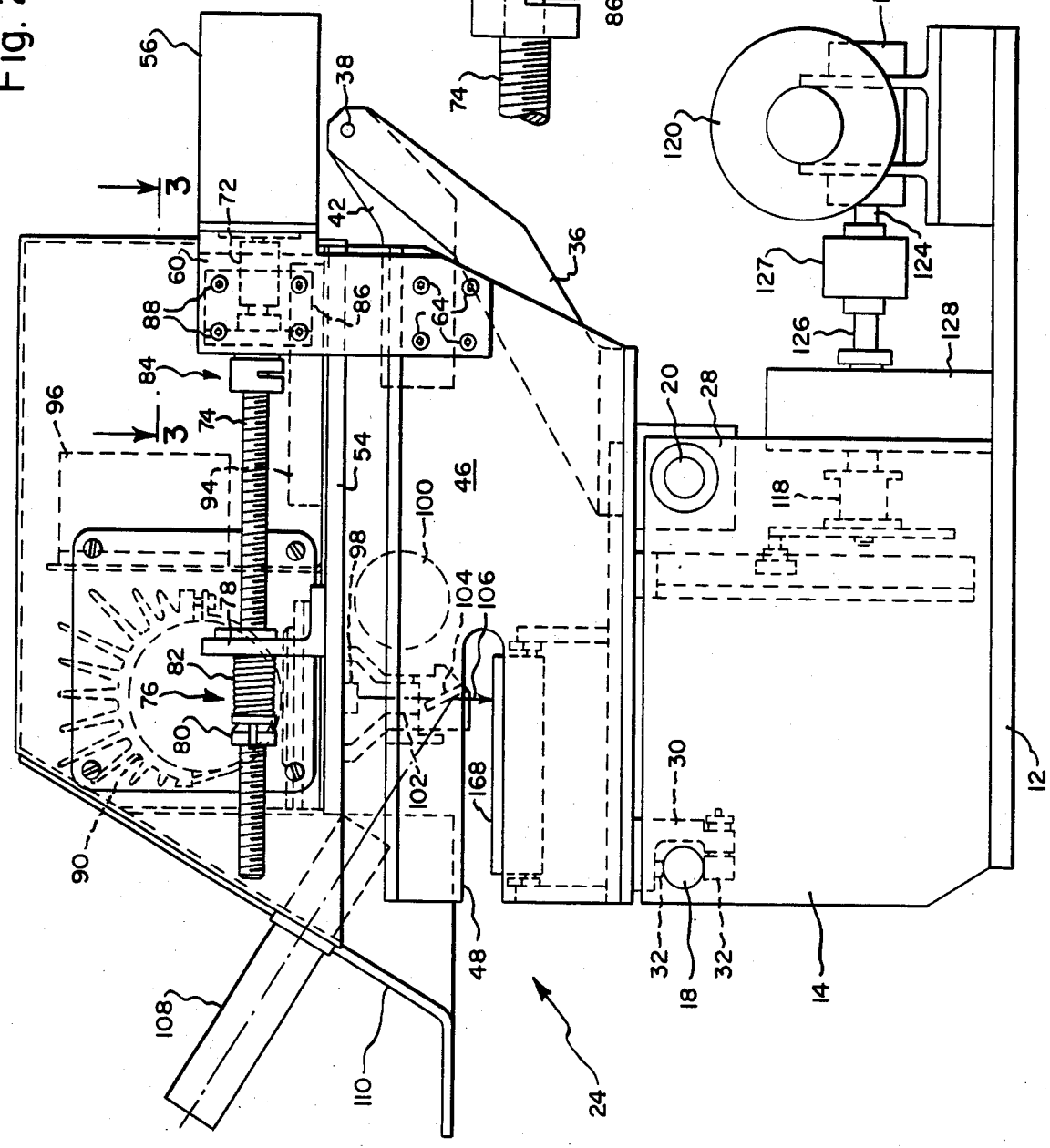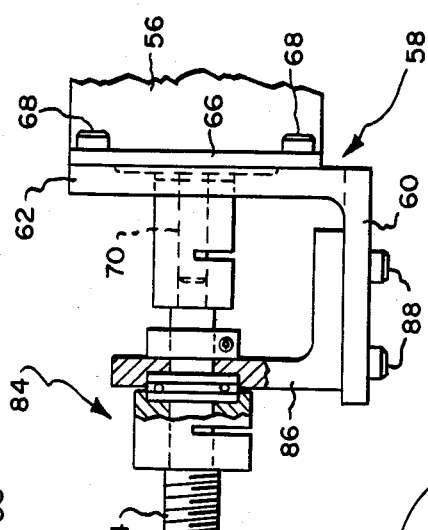

Fig. 9.
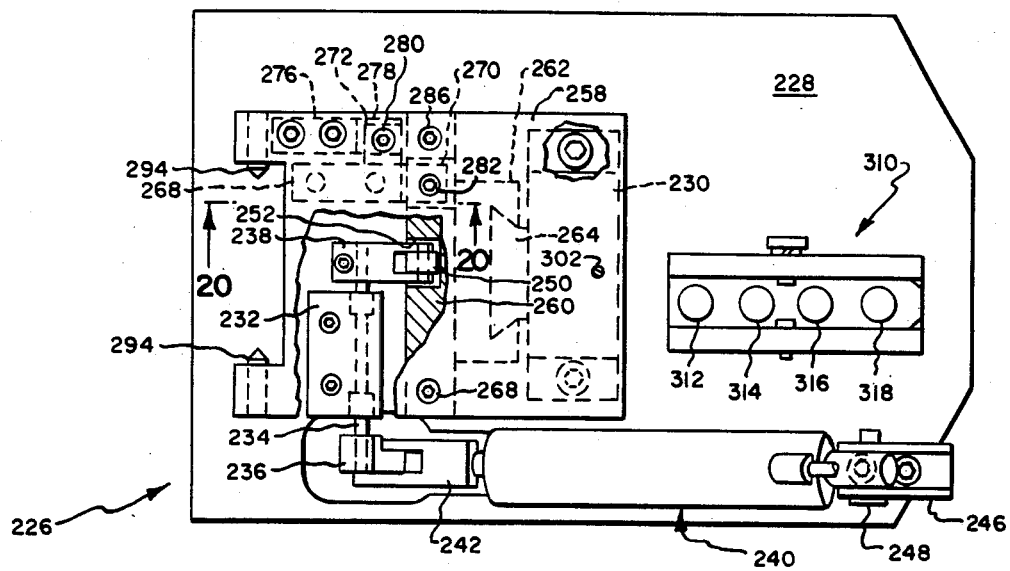
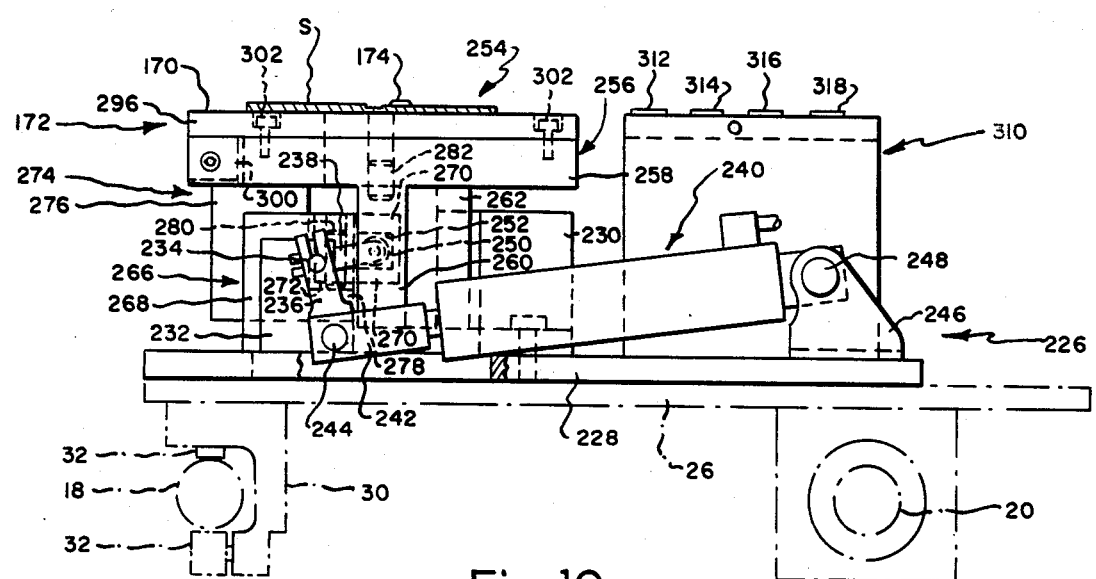
Fig. 10.
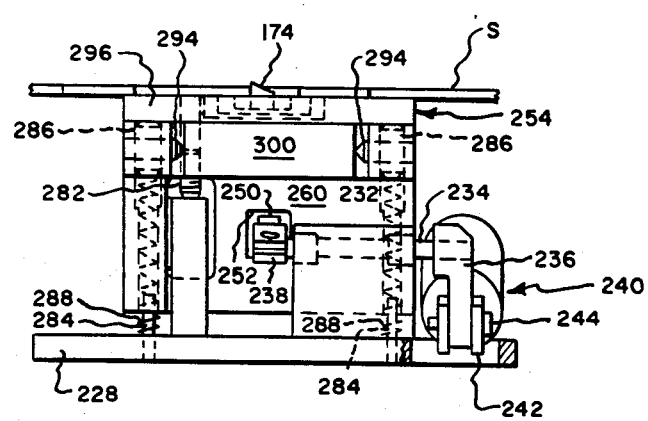
Fig. 11.

APPARATUS FOR MEASURING COATING THICKNESS

TECHNICAL FIELD

The present invention relates generally to an apparatus for measuring the thickness of a coating on a moving strip of material which moves continuously along a predetermined path, and more particularly to a coating thickness measuring apparatus which does not require that the coating on the strip of material be contacted during the measurement of the coating.

BACKGROUND ART

U.S. Pat. No. 4,383,172 granted May 10, 1983 discloses an apparatus for measuring coating thicknesses on continuously moving material, the apparatus utilizing beta backscatter techniques which requires that a probe be placed into contact with the strip of continuously moving material.

U.S. Pat. No. 4,451,732 issued May 29, 1984 discloses an apparatus similar to the prior patent but which has the capability of measuring the coating thickness on a continuously moving strip of material wherein the coating is deposited upon an angularly disposed portion of the strip of material.

It is also commercially known to measure the thickness of a coating on a piece of material utilizing X-ray technology. By utilizing X-ray technology, it is not necessary to contact the coating on the material. However, it is necessary that the X-ray unit be disposed a precise distance away from the surface of the coating to be measured.

OBJECTS AND SUMMARY OF THE INVENTION

It is a principal object of the present invention to provide an improved apparatus for measuring the thickness of a coating on a continuously moving strip of material wherein the measurement is done by a measuring device utilizing a proportional counter and either an X-ray tube or a gamma ray emitting isotope which requires that the surface of the strip of material be maintained a predetermined spaced apart measuring distance away from the measuring device.

It is further object of the present invention to provide an apparatus for measuring the thickness of a coating on a continuously moving strip of material wherein differing laterally spaced apart positions as well as differing heights can be measured.

It is an additional object of the present invention to provide an improved chain drive for an apparatus for measuring the thickness of a coating on a continuously moving strip of material.

In accordance with the above objects, the measuring apparatus of this invention includes a frame, a shuttle mounted on the frame and capable of being moved between first and second locations, engaging means carried by the shuttle and capable of engaging the moving strip to cause the shuttle to be moved from the first location to the second location at the same speed as the moving strip, and measuring means having at least a portion mounted on the shuttle to one side of the strip. In addition, a support is mounted on the shuttle to the other side of the strip, the support being capable of supporting the strip of material during the measurement of the coating on the strip of material. The support means is adjustable towards and away from the portion of the measuring means mounted on the shuttle to establish a predetermined spaced apart measuring distance between the portion of the measuring means and the coating on a specific portion of the strip of material.

The foregoing will be more fully understood after a consideration of the following detailed description taken in conjunction with the accompanying drawings in which a preferred form of this invention is illustrated.

BRIEF DESCRIPTION OF THE DRAWINGS

FIG. 2 is a side view of the structure illustrated in FIG. 1.

FIG. 3 is a sectional view taken generally along the line 3—3 in FIG. 2.

FIG. 9 is a top view of a portion of the machine shown in FIG. 1, this view showing the engaging means, a portion of the support means, and the adjusting means, the work plate not being shown in this view.

FIG. 10 is a side view of the portion of the machine shown in FIG. 9, this view also illustrating the work plate in its assembled position.

FIG. 11 is a front view of the portion of the machine shown in FIG. 10.

DETAILED DESCRIPTION

The apparatus of the present invention is customarily associated with a plating line at a customer's installation to determine whether the thickness of the material coated upon a strip of material meets the standards established by the customer. Thus, with reference to FIG. 1, the customer's plating line would be disposed to the left of the figure and a strip of material S would be discharged by the coating apparatus and would follow a predetermined generally linear path initially past a first location A, then past a second location B, and then to a take-up coil C which is also part of the customer's installation. The coil C maintains the strip under tension at all times. The apparatus of this invention would be disposed in the path of the strip of material and includes a principal frame, indicated generally at 10, upon which various of the component parts of the apparatus of this invention would be mounted. While not shown in the various figures, the apparatus also includes a computer and a keyboard which interfaces with the computer to control the operation of the various pieces of hardware illustrated in the figures.

In the following description, the apparatus of this invention will be described in the manner the components would be oriented if the strip were horizontal when it came out of the plating line and with the plating on the top of the strip. However, the apparatus could be disposed in other orientations, as for example, rotated 90° clockwise as viewed in FIG. 2 should the strip be rotated 90° clockwise. Therefore, it should be appreciated that the spatial references are for the convenience in understanding only and applicant does not intend to be limited to a specific spatial orientation.

Figure 1:
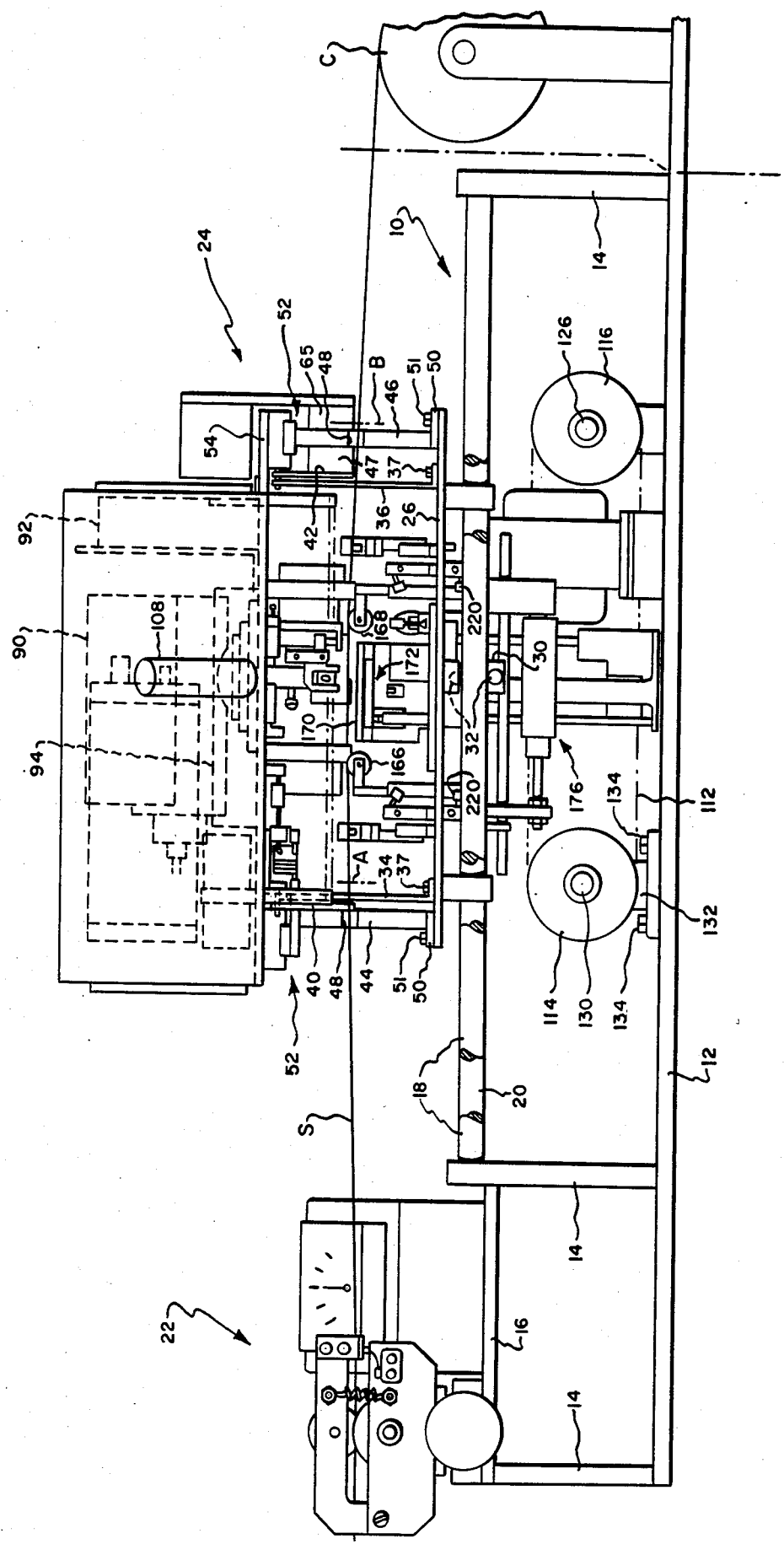
FIG. 1 is a front elevational view of a preferred form of the improved apparatus of this invention, parts being omitted for purposes of clarity.

The frame 10 includes a base plate 12 which is supported in a suitable manner so that it underlies the predetermined generally horizontal path of the strip of material S. The frame additionally includes vertical frame members 14, and three are illustrated in FIG. 1, there being left-hand, center and right-hand frame members. Extending between the left-hand frame member and the center frame member is a horizontal support assembly 16. Extending between the center frame member and the right-hand frame member are front and rear parallel rails 18 and 20, respectively. These rails, which as illustrated are of circular cross section, lie in a common horizontal plane and are generally parallel to the predetermined path of movement of the strip of material.

Mounted upon the horizontal support member 16 is a sensing device indicated generally at 22. This device senses the speed of the continuously moving strip of material S, and also senses imperfections in the strip such as splices. The sensing device is of the same general construction as that shown in U.S. Pat. No. 4,451,732, the disclosure of which is incorporated herein by reference thereto, and therefore it will not be described in further detail.

The apparatus further includes a shuttle, indicated generally at 24. The shuttle is mounted upon the rails 18 and 20 for reciprocal movement thereon. The shuttle includes a shuttle base plate 26 which carries depending rear linear bearings 28 which receive the rear rail 20. In addition, a depending bracket 30 is also secured to the shuttle base plate 26, the depending bracket in turn carrying upper and lower rollers 32, 32 which engage the front rail 18 to provide additional stability.

The portion of the shuttle which is normally disposed above the strip S is hingedly secured to the base plate 26 so that the upper portion can be swung out of the way for purposes of service. To this end, left and right upwardly and rearwardly extending pivot brackets 34, 36, respectively, are provided, the base portion of each of the brackets being rigidly secured to the shuttle base plate 26 by fasteners 37, shown only in FIG. 1. The upper and rearwardly extending end of each pivot bracket is provided with an aperture which can receive a pivot pin 38. Left and right mounting brackets 40, 42, respectively, are also provided, the upper and rearward end of the left mounting bracket 40 being pivotally secured to the left pivot bracket by a pivot pin 38, and similarly the right mounting bracket 42 being pivotally secured to the right pivot bracket by another pivot pin 38. The left and right mounting brackets are in turn rigidly secured to left and right side frame members 44, 46, respectively. To this end, the left bracket 40 is connected directly to a sidewall of the left side frame member 44, and the right bracket 42 is connected to a sidewall of the right side frame member by a spacer 47. Each of the left and right sidewalls 40, 46 is provided with a cutout 48 which is open to the front of the machine, the cutout being capable of receiving the strip S during operation. The lower edge of each of the sidewalls 44, 46 is provided with a foot 50 which rests upon the shuttle base plate 26 during normal operation, the foot being secured to base plate 26 by fasteners 51, shown only in FIG. 1.

The upper edge of each of the sidewalls 44, 46 receives a ball slide assembly 52 which is parallel to the base plate 26 and at right angles to the path of travel of the strip S. The upper surface of each of the ball slide assemblies 52 can be moved transversely to the path of the strip S, and a mounting plate 54 is secured to the upper surfaces. The mounting plate can be moved transversely to the path of the strip by the operation of a stepping motor 56 (FIG. 2). The motor is mounted on a motor mounting bracket indicated generally at 58 (FIG. 3). The bracket 58 has a vertically extending side portion 60 and a short upper rear portion 62 at a 90° angle to the side portion 60. The lower end of the side portion 60 is secured to the right side frame member 46 by fasteners 64 and spacer 65 (FIG. 1). The upper rear portion 62 is in turn secured to a flange 66 on the stepping motor 56 by fasteners 68. The motor output shaft 70 is connected by coupling 72 to a lead screw 74. The screw in turn passes through a conventional anti-backlash mechanism, indicated generally at 76, the mechanism being supported by an apertured bracket 78, the bracket 78 in turn being rigidly secured to the mounting plate 54. The zerobacklash mechanism includes a nut 80 and a spring 82 which bears against the nut 80 as well as the bracket 78. In order to prevent undue loading on the output shaft 70 of the motor 56 in the event that the parts are rotated clockwise 90° from the position shown in FIG. 2, a thrust bearing assembly, indicated generally at 84, is provided, the thrust bearing assembly bearing against a thrust bearing support 86 which is secured to the side portion 60 of the motor mount by fasteners 88.

Mounted upon the mounting plate 54, either above the plate or below the plate, are a number of components which are utilized for determining the thickness of the coating on the strip of material S. Components mounted on the upper surface include an X-ray tube 90, a fan 92 which is utilized to keep the X-ray tube 90 from overheating, a two kilovolt power supply 94, and a pre-amplifier 96. Mounted below the mounting plate 54 are a shutter 98, a signal detector in the form of a proportional counter 100, a collimator 102, and a mirror 104. The shutter and collimator cause the radiation beams from the X-ray unit to be tightly focused along a narrow path indicated by the arrow 106. The mirror 104 is provided with a pin hole like aperture (not shown) through which the rightly focused radiation beam can pass.

As is well-known in the art, it is essential that the X-ray unit be at a prescribed distance away from the target coating surface if a proper thickness measurement is to be obtained. In accordance with the principles of this invention, the proper target distance is obtained by moving the target towards and away from the X-ray unit. The target distance is set by using a microscope 108 having a fixed focal length. The microscope 108 is in turn rigidly interconnected with a radiation shield 110, the radiation shield enclosing the X-ray tube 90 and being secured to the mounting plate 54 for movement therewith. The image of the coating seen through the microscope will be reflected by the mirror 104.

The shuttle assembly 24 which has been described above can be moved along the rails 18 and 20 from a location wherein the beam 106 of the X-ray unit is to the left of the first location A to another position wherein the beam is to the right of the second location B. This movement can be achieved by coupling the shuttle to a constantly running chain 112 which passes over left and right sprockets 114, 116. Alternatively, the shuttle and strip can engage each other adjacent location A, the engagement causing the shuttle to be moved at the same speed as the strip as the strip progresses from point A to point B, at which point the shuttle will then be disengaged from the strip. The upper flight of the chain moves in the same direction as the strip and is driven at a speed just slightly less than the speed of the strip. Thus, the shuttle can be driven by the strip at a speed slightly in excess of that of the chain when the shuttle and strip are engaging each other. This is possible because the drive to the chain includes an overrunning clutch 118 as shown in FIG. 2. The drive includes a variable speed motor 120, the output speed of which is set so that the upper flight of the chain moves at a speed just slightly less than that of the strip S, the speed setting being established by the tachometer in the sensing device 22 and also by the computer controls. The output of the variable speed motor 120 is coupled to a right angle gear box 122 which in turn drives a shaft 124. Shaft 124 in turn drives a second coaxial shaft 126 through the torque limiting clutch 127. The coaxial shaft 16 is supported by a pillow block and support assembly 128 which is rigidly mounted on the base plate 12. The front end of shaft 126 in turn drives the right sprocket 116 through overrunning clutch 118. The left-hand sprocket 114 is mounted on a short idler shaft 130 carried by a pillow block and support assembly 132. As is conventional, support 132 can be moved to the left or right to vary the tension on the chain 112 and can be secured in place by conventional fasteners 134.

Figure 4:
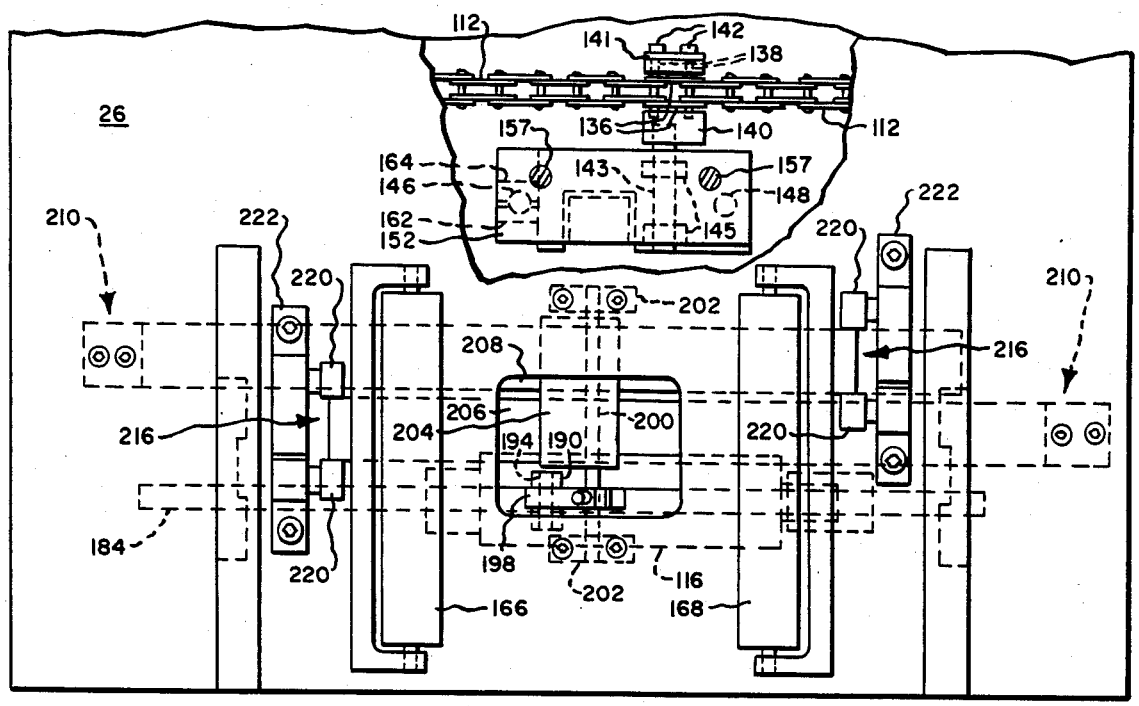
FIG. 4 is an enlarged top plan view of a portion of the machine shown in FIG. 1, parts such as the support table being omitted for purposes of clarity, this view showing the disengaging means and a portion of the drive means.

As can be seen from FIG. 4, the ends of the chain 112 are connected together by links 136 and connecting pins 138 which pass through the links 136 and the opposed ends of the chain 112. A saddle block 140 is provided with parallel apertures which receive the ends of the connecting pins 138. The pins 138 are maintained within the saddle block 140 by a keeper plate 141 which is held in place by fasteners 142. The saddle block is also provided with a suitable aperture for the reception of a driving pin 143. The aperture which receives the driving pin 143 may intersect one of the apertures which receives a pin 138, but does not extend all the way through the driving pin receiving portion of the saddle block. One end of the pin 143 is force fit into the driving pin receiving aperture. The other connecting pin receiving aperture in the portion of the saddle block which also receives the driving pin does not extend all the way through said portion as can be seen from FIG. 4. The other end of the pin 143 is rotatably journaled in a yoke 144 by spaced apart ball bearings 145. The yoke in turn is supported for vertical reciprocal movement on spaced-apart rods 146, 148. The rods are in turn supported by an I-shaped mounting bracket, indicated generally at 150, the bracket having an upper transverse portion 152, a lower portion 154, and a central portion 156. The upper end of the rods are secured to the upper transverse portion 150 and the lower ends of the rods 146 and 148 are secured to the lower portion 154. The upper portion 152 is rigidly secured to the shuttle base plate 26 by suitable fasteners 157 shown in section in FIG. 4. As can be seen from FIGS. 5 and 10, the central portion of the yoke 144 is provided with a cutout which receives the central portion 156 of the I-shaped mounting bracket. The yoke is provided to its right-hand side with a pair of spaced-apart bushings 158, 160 which slidably receive the right-hand rod 148. The other side of the yoke is provided with front and rear slide blocks 162, 164 which engage the left-hand rod 146.

Figure 6:
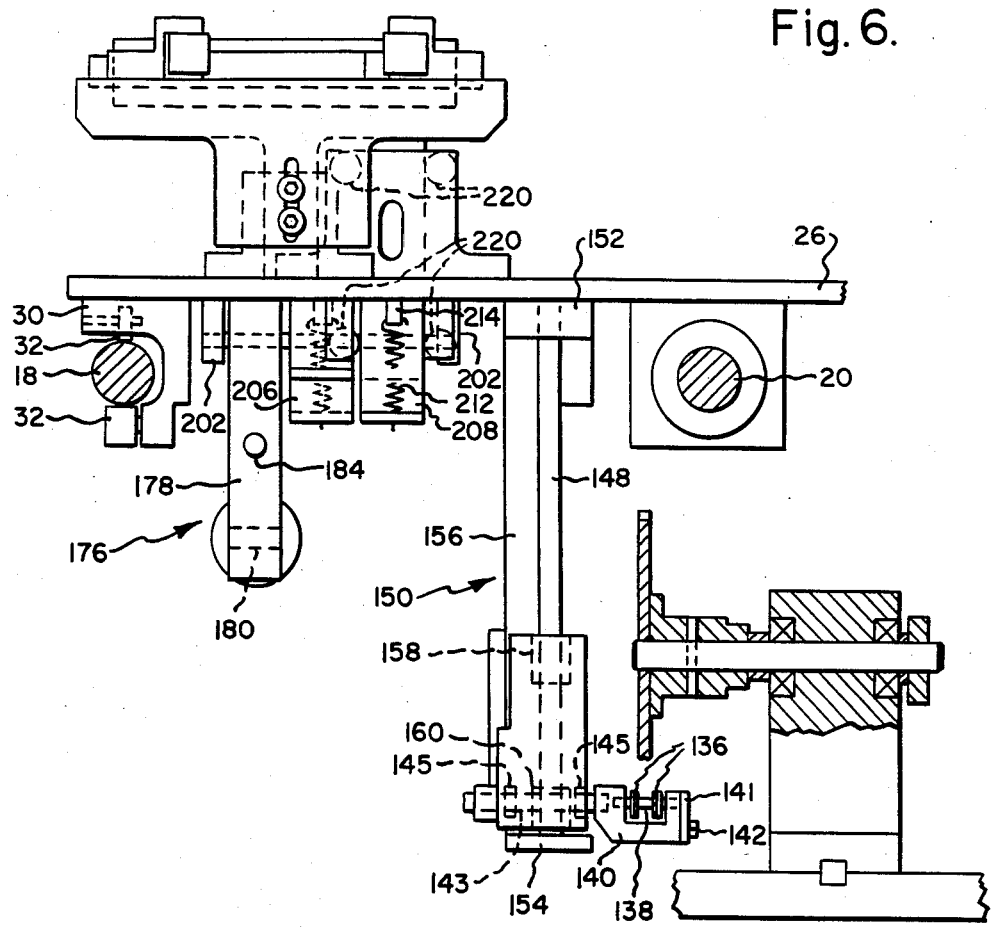
FIG. 6 is a side elevational view of the structure shown in FIG. 5.

It can be seen from FIGS. 1 and 2 that as the right-hand sprocket 116 is caused to be driven in a clockwise direction by the motor 120, the upper flight of the chain 112 will move to the right and the lower flight will move to the left. If the connecting pins 138 and saddle block 140 are in the position shown in FIG. 6, movement of the chains will cause the mounting bracket 150 and base plate 26 to be driven to the left until the saddle 140 reaches a point on the sprocket 114 where it is directly to the left of the idler shaft 130. After this point has been reached, continued movement of the chain will cause the base plate to move to the right until the saddle block 140 achieves a position directly to the right of the drive shaft 126.

Figure 7:
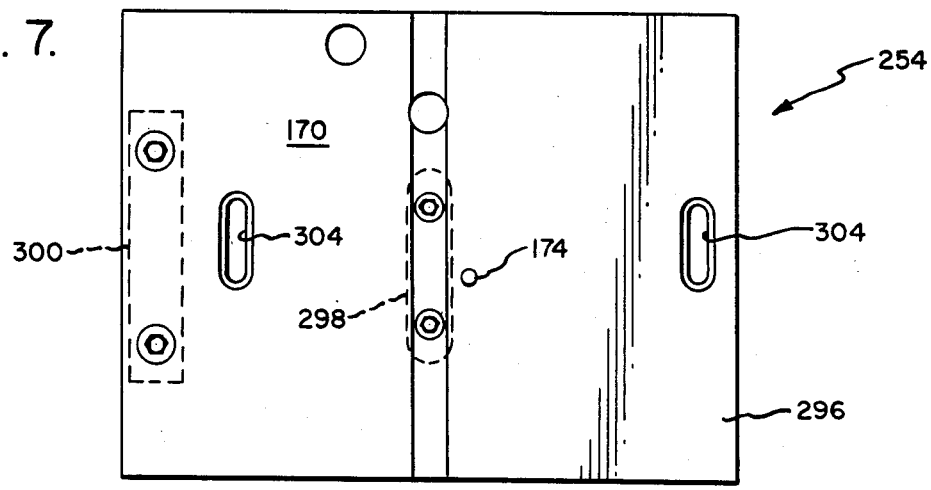
FIG. 7 is a top view of a work plate which forms part of the support means of this invention.
Figure 8:
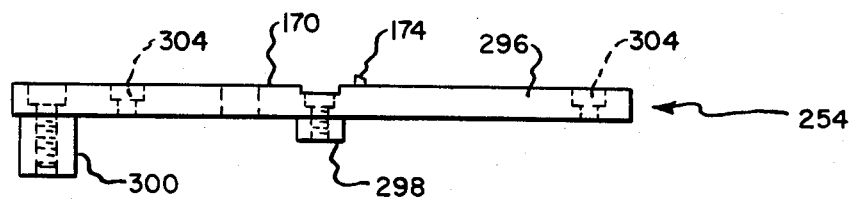
FIG. 8 is a side view of the work plate shown in FIG. 7.

As can be seen from FIG. 1, the strip of material does not pass in a straight line from the sensing device 22 to the coil C but is in fact supported between locations A and B by a portion of the shuttle due to the tension on the strip imposed by take-up coil C. The strip can be in one of two positions, the first being a raised position where it is engaged by rollers 166, 168 or in a lowered position where it is supported upon the planar substantially horizontal upper surface 170 of a vertically shiftable support or table indicated generally at 172. As shown in FIGS. 7–9, a drive pin 174 is mounted on the upper surface of the support 172, the pin being at any desired location depending upon the configuration of the particular strip S. The engaging means or drive pin 174 engages the strip when the disengaging means or rollers 166 are moved from their raised position, shown in FIG. 5, to a lowered position which causes the strip to be placed into contact with the upper surface 170.

Figure 5:
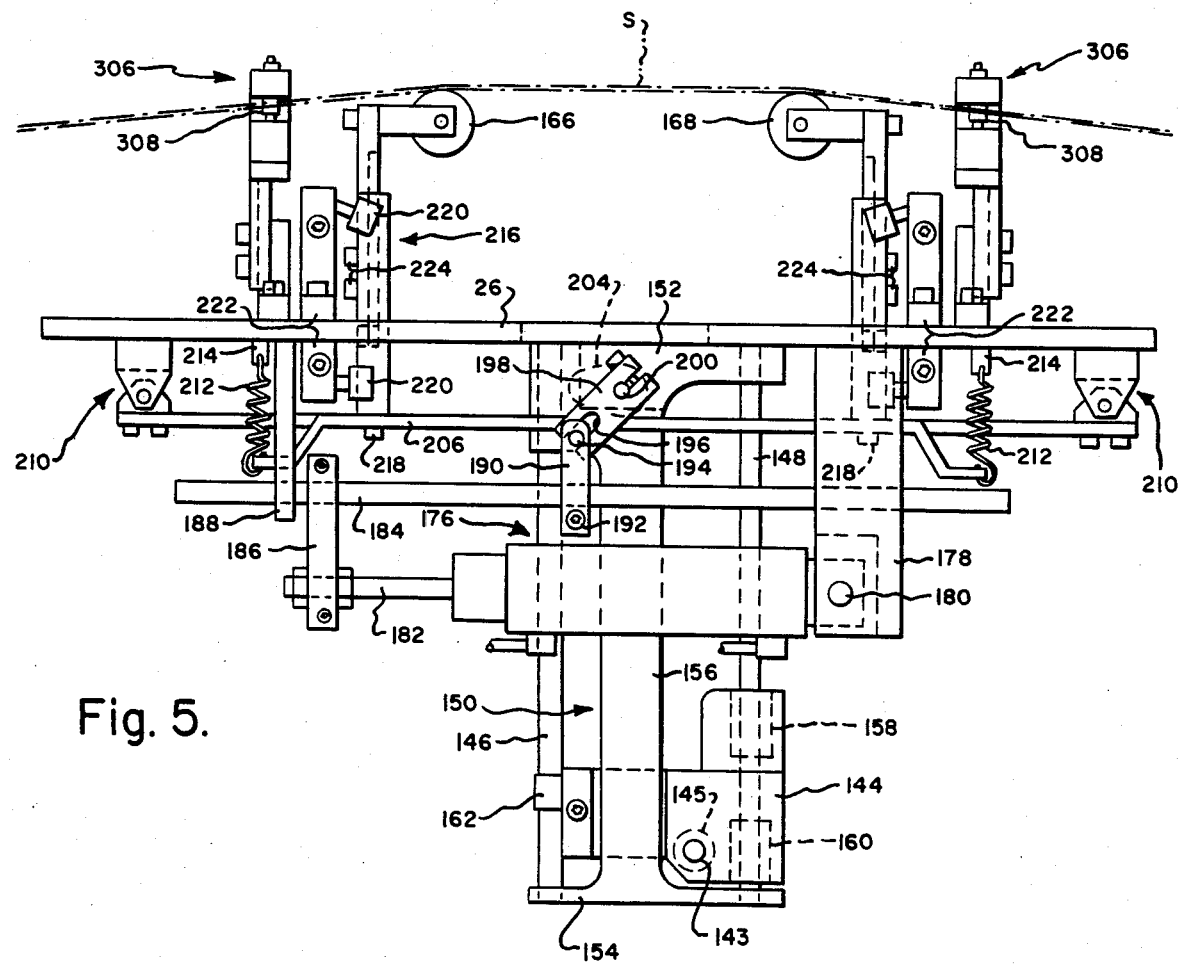
FIG. 5 is a front elevational view of the structure shown in FIG. 4, the chain shown in FIG. 4 not being illustrated.

The rollers 166, 168 are caused to be moved up and down by the operation of a double acting air cylinder assembly 176, the anchor end of which is secured to a mounting block 178 by pin 180 and the cylinder rod 182 being secured to a slide rod 184 by bracket 186 which is rigidly secured to both the slide rod 184 and the rod 182. The mounting block 178 is provided with a suitable aperture for the reception of the slide rod 184, and the upper end of the mounting block is rigidly secured to shuttle base plate 26 in any suitable manner. Another portion of the slide rod 184 passes through another mounting member 188, the upper end of which is also secured to the base plate 26 in any suitable manner. It can be seen that as the cylinder assembly 176 is extended or retracted, the slide rod 184 will be moved between left and right-hand positions. Another bracket 190 is rigidly secured to rod 184 by fastener 192 for movement therewith, the bracket 190 supporting a pin 194 which is received within a slot 196 of a cam operating member 198 which is rigidly secured to a rotatable pivot shaft 200. The shaft 200 is in turn rotatably supported by depending pivot shaft support brackets 202 secured to plate 26 by conventional fasteners (no number). The shaft 200 supports a cam 204 for rotation therewith. As the cylinder 176 causes the rod 182 to be moved from an extended position as shown in FIG. 5 to a retracted position (to the right), the cam 204 will be caused to be rotated causing it to bear against a pair of pivoted links, there being a front pivoted link 206 and a rear pivoted link 208. Each of the pivoted links is in turn pivotally interconnected to the shuttle base plate 26 by a pivot block assembly 210. The other end of each of the pivoted links is biased in an upward direction, as viewed in FIG. 5, by a tension spring 212, the upper end of which is securd to a suitable mounting bracket 214 which is in turn fixed to the base plate 26. Upwardly vertically extending roller arm holder assemblies 215 are secured at their lower ends to each of the pivoted links 206, 208 by fasteners 218. The assemblies are guided for vertical swinging movement (about pivots 210) by suitable upper and lower guide rollers 220 which are in turn carried by upper and lower brackets 222 fixed to upper and lower surfaces of the shuttle base plate 26. It can be seen that as the rod 184 is moved from the left-hand position shown in FIG. 5 to the right-hand position, the cam 204 will be rotated in a counterclockwise direction to bear against the pivoted links 206 and 208 to cause these links to be pivoted downwardly. As the links are pivoted downwardly against the springs 212, the associated roller arm holder and rollers 166, 168 will be moved downwardly to a position where their upper surface is below the upper surface 170 so that the strip S will contact the upper surface 170 and the drive pin 174, the movement of the strip causing the shuttle to be moved with the strip. Similarly, when the cylinder 176 causes the rod 182 to be extended to the left as viewed in FIG. 5, the cam will rotate in a clockwise direction to the position shown permitting the links 206 and 208 to be moved upwardly by springs 212 to the position illustrated causing the rollers 166 and 168 to disengage the strip from the engaging means or pin 174. As it may be desirable to adjust the height of the rollers 166, 168, the roller arm holder assemblies are designed with telescoping parts which can be held in differing positions of vertical adjustment by fasteners 224.

As previously noted, it is essential that the coating on the surface of the strip be at a fixed distance away from the X-ray tube 90 in order to achieve a proper reading. In addition, as the X-ray tube can be moved to various transverse positions across the strip of material S by the stepping motor 56, it is possible to measure differing locations on the strip of material, which differing locations may be at differeing heights. Therefore, it is desirable that the vertically shiftable support means 172 be disposable at differing positions of adjustment to bring the coating into the prescribed distance away from the X-ray tube 90. Accordingly, adjusting means are mounted on the shuttle which is capable of adjusting the support means 172 towards and away from the X-ray tube to establish a spaced-apart predetermined measuring distance between the X-ray tube and the coating on a specific portion of the strip of material.

The vertically shiftable support means 172 is mounted upon an adjusting means indicated generally at 226. The adjusting means consists of a number of components supported on a mounting plate 228 which is in turn secured to the shuttle base plate 26 for movement therewith. Mounted upon the plate 228 is a slide mounting block 230, a cylinder mounting bracket to which one end of an air cylinder assembly is secured, and a rock shaft mounting block 232. The rock shaft 234, which is journaled within the rod shaft mounting block 232, is provided with first and second spaced-apart rock arms 236 and 238. The first rock arm 236 is interconnected with the rod end of the air cylinder assembly 240 by means of a conventional clevis 242 and pin 244. The other end of the air cylinder assembly 240 is interconnected with the cylinder mounting bracket 246 by a pivot pin 248. The second rock arm 238 has a roller carrying end remote from the rock shaft 234, the roller 250 being engageable with a cutout 252 in the support means 172.

Figure 12:
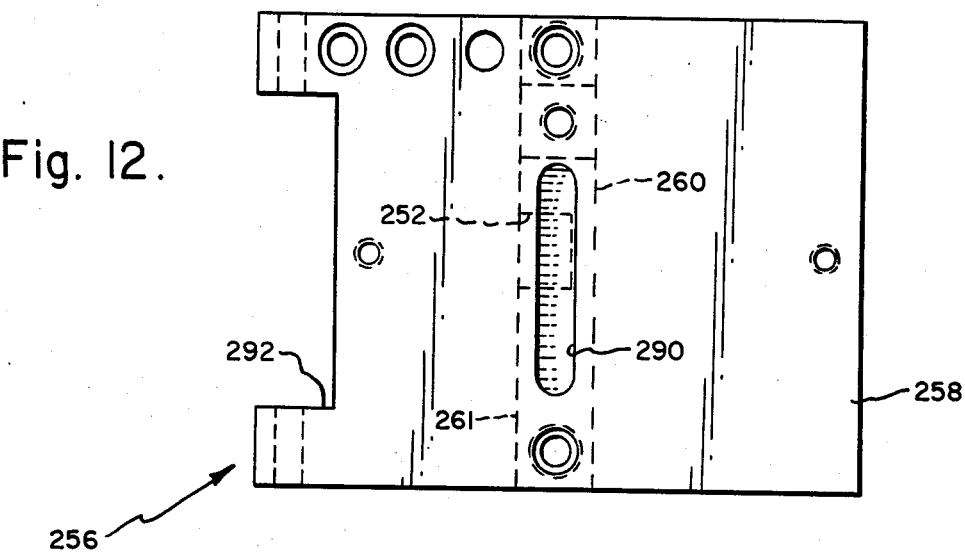
FIGS. 12–14 are top, side and front views, respectively of the T-plate, which is one of the parts of the machine illustrated in FIGS. 9-11.
Figure 13:
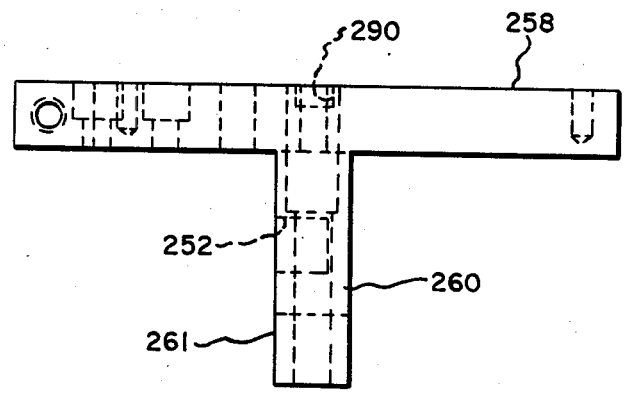
Figure 14:
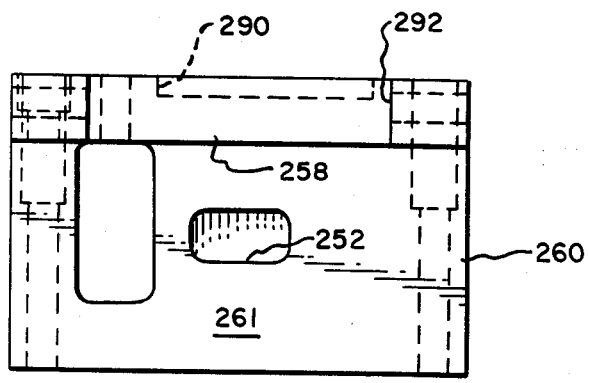

The support means 172 consists of two principal components, one being the work plate assembly indicated generally at 254 and shown in FIGS. 7 and 8, and the other being the T-plate indicated generally at 256 and shown in FIGS. 12-14. The T-plate includes an upper horizontal portion 258 to which the work plate assembly 254 is adjustably secured in a manner which will be discussed below. The T-plate additionally includes a vertical portion 260 which extends downwardly from the upper horizontal portion 258 and lies in a plane generally parallel to the path of movement of the strip S. The forward surface 261 of the vertical portion is provided with the cutout 252. The rear surface of the vertically extending portion is secured to a slide block 262. The slide block 262 is in turn interconnected with dovetail slide 264 which is in turn mounted on the slide mounting block 230 to provide for vertical reciprocal movement of the T-plate 256 with respect to the mounting plate 228. While a dovetail slide has been illustrated for the convenience of understanding the drawings, a ball slide assembly is in fact utilized in a commercial embodiment of this invention.

As can be seen from FIG. 10, if the cylinder assembly 240 were to be extended, the rock arm 238 and roller 250 would be moved downwardly thus engaging the bottom surface of the cutout or slot 252 to cause corresponding downward movement of the T-plate. Similarly, if the cylinder assembly 240 were to be retracted, the roller 250 would be moved upwardly causing corresponding upward vertical shifting movement of the T-plate.

Figure 15:
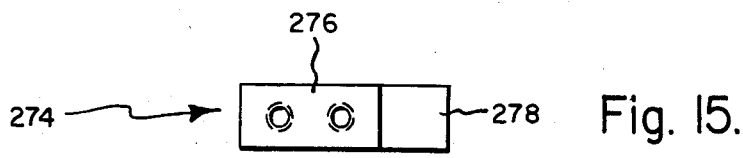
FIGS. 15 and 16 are top and side views, respectively, of a portion of a first adjustable stop assembly which establishes the upper normal position of the support means.
Figure 16:
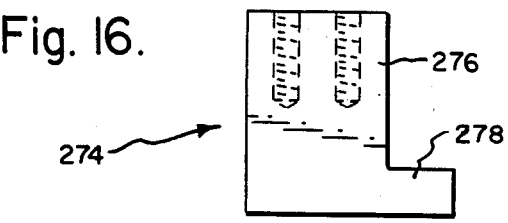
Figure 20:
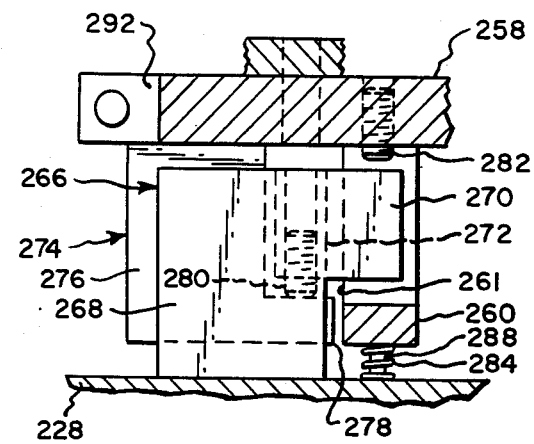
FIG. 20 is a section taken generally along line 20—20 in FIG. 9.
Figure 17:
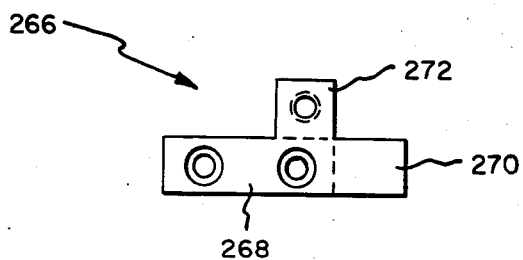
FIGS. 17–19 are top, side and rear views, respectively, of a portion of a second adjustable stop assembly which establish the lower position of the support means.
Figure 18:
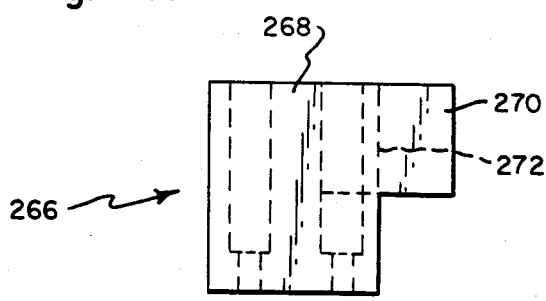
Figure 19:
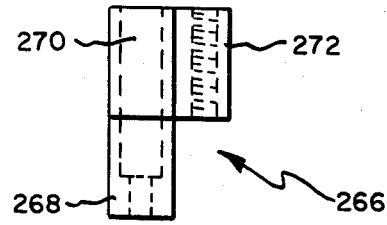

The upward movement of the T-plate is limited by a first adjustable stop assembly. The first adjustable stop assembly includes first and second stop blocks shown in FIGS. 15 and 17. Referring first to the first stop block shown in FIG. 17, as well as in FIGS. 18 and 19, the stop, which is indicated generally at 266, includes a principal box-like portion 268 which is secured to the base plate 228 by fasteners not shown. The first stop block 266 further includes a rear overhanging portion 270 and a side overhanging portion 272. Cooperating with the first stop block 266 is the second stop block indicated generally at 274 and shown in FIGS. 15 and 16, the second stop block including a principal box like portion 276 and a rearwardly extending underhanging portion 278. The underhung portion 278 is adapted to be disposed below the side overhanging portion 272 of the first stop block 266. The side overhanging portion 272 is provided with a threaded aperture which receives a threaded adjustable stop screw 280 (shown in dotted lines in FIG. 10), which stop screw is adapted to contact the upper surface of the underhung portion 278 to limit upward movement of the T-plate and work plate assemblies in various positions of adjustment. To this end, it should be noted that both the T-plate and work plate are provided with suitable aligned apertures through which a tool may be passed for adjusting the stop screw 280.

In order to limit downward movement of the T-plate and work plate assembly, a second adjustable stop assembly is provided. To this end, the T-plate is provided with a threaded aperture which receives another adjustable stop screw 282 which bears against the upper surface of the rear overhanging portion 270 as best shown in FIGS. 9 and 10, the stop screw 282 and upper surface of the portion 270 forming the second adjustable stop assembly. In order to provide access to the adjustable stop screw 282, the work plate is also provided with an aperture disposed above the stop screw 282 so that access can be had to the stop screw.

In normal operation the T-plate will be biased upwardly against the first stop assembly. To this end, opposed sides of the vertically extending portion 260 of the T-plate 256 are provided with bores which receive springs 284. The upper end of the bores are closed off by spring pressure adjusting screws 286. The lower ends of the springs are disposed about upwardly extending pins 288 mounted on the mounting plate 228. Thus, in normal operation, the springs will cause the T-plate to be moved to its normal raised position wherein the first stop assembly establishes a first or upper position. In the event that it is desired to move the support means 172 downwardly to its second position of adjustment, the air cylinder assembly 240 is simply extended to cause the roller 250 to move downwardly bringing the T-plate assembly as well as the work plate assembly downwardly until the second stop assembly establishes the second or lower position.

While the apparatus of this invention is customarily positioned in the customer's strip line in such a manner that the portion to be measured coincides with the beam of the X ray when the strip S is engaged by the drive pin 174, it is possible that a small amount of lateral adjustment may be required. To this end, the work plate assembly is mounted upon the T-plate for lateral adjustment. Accordingly, the upper surface of the T-plate is provided with a keyway which is disposed parallel to the path of movement of the strip. In addition, the upper horizontal portion is also provided with a front cutout 292, the portion to either side of the cutout being tapped for the reception of horizontal adjusting screws 294. The work plate assembly 254 includes as its principal component a generally rectangular piece of flat plate stock material 296 to which is secured on its lower surface a key 298 which can be received in the keyway 290 and also with an adjustment block 300 which can be contacted by the screws 294 to shift the work plate assembly laterally. Once the desired position of lateral adjustment has been achieved, the work plate 254 can be locked to the T-plate 256 by screws 302 received within slots 304 on the plate 254.

It should be noted at this point that the support means 172 is adjustable in a direction parallel to the path of movement of the strip S, and also in a direction normal to the surface of the strip. Similarly, the X-ray unit is adjustable across the strip. Therefore, a very precise alignment can be achieved. However, during operation of the customer's plating line, it is necessary to maintain the transverse position of the strip. To this end, as shown in FIG. 5, side guides, indicated generally at 306, are provided, the side guides including rollers 308 disposable to either side of the strip to maintain the strip in its desired path. As the side guides are not a feature of the present invention, they will not be described in further detail.

Before the running of the apparatus, it will first be necessary to mount standards within a standard holder assembly 310, various standards being indicated at 312, 314, 316 and 318.

The operation of the apparatus just described will now be set forth. In the following description, an X adjustment is an adjustment made parallel to the direction of path of movement of the strip to be measured. A Y adjustment is made transverse to the strip but in the plane parallel to the upper surface 170 of the workplate 254. Finally, a Z adjustment is made normal to the surface 170.

Initially the apparatus will be installed within the customer's plating line at the discharge end of the plating apparatus but before the take-up coil C, with the plated strip S overlying the support 172. The drive pin 174 will be properly positioned on the alignment plate or work plate 254, the proper position being based upon a sample of the strip S. Thus, the drive pin 174 is so located that the parts on the strip which are to be measured will all lie in the Y axis as determined by the movement of the X-ray unit by the stepping motor 56.

After the alignment plate has been provided with a drive pin 174 at a suitable location, a sample section of the strip to be measured is placed upon the upper surface 170 of the plate 254. The operator of the apparatus will now view the work piece through the fixed focus microscope and will make a Z adjustment by adjusting the screw 280 to bring a first specific surface location into focus. X and Y adjustments are now made to insure that the precise point to be measured is being viewed through the microscope. It should be noted that the microscope is so established that its focal point will correspond with that location contacted by the X-ray beam. After the X alignment has been completed the work plate assembly will be secured in its final position by turning down screws 302. In addition, the Y location, which is under control of the stepping motor, will be stored in memory by operation of the computer keyboard. If additional Y locations are to be established, this is also done by operation of the stepping motor and through operation of the computer keyboard which will cause these additional Y locations to be stored in the computer memory. Y locations will also be established for the standards so that the unit can maintain proper calibration. If one or more of the additional Y locations which is to be measured is at a differing height than that established for the first location, a second height can be established by adjusting the stop screw 282 to cause the cylinder assembly to move the support 172 to a lower position for the second height. In this regard, it should be noted that it is customary to first establish the height of the lowest portion on the strip to be measured and then to establish the height on higher portions if there are any higher portions to be measured. After the X and either one or two Z positions have been established on the apparatus, and all Y positions have been stored in memory, it is now possible to start the running of the machine.

If the computer has not previously been programmed as to the particular operation the machine is about to perform, it will now be programmed. The programming will include information as to what is being measured at each Y location, what the surface height is at each Y location, and how long a time each Y location is to be measured in order to establish an averaged measured value. Also, the strip S will be placed into the machine and during operation of the customer plating line, it will be maintained under tension by take-up coil C. The tension on the strip will maintain the strip in contact with either the disengaging rollers 166, 168 or the upper surface 170 of the work plate assembly 254.

The operation of the machine is under control of the computer and it will cause the motor 120 to be run at such a speed as to cause the shuttle to be moved at a speed just slightly less than the sensed speed of strip S. When the pin 174 on shuttle 24 is in its starting position A, the computer will normally cause the cylinder assembly 176 to be retracted thus bringing the rollers 166 and 168 to a lowered position where the drive pin 174 and strip S can engage each other to cause the shuttle to be moved by the strip of material until it reaches position B. The X-ray unit will have been moved by the stepping motor to the desired Y location on the strip to make the desired measurement. When the shuttle reaches position B, the cylinder assembly 176 will be operated to cause the disengaging rollers to move upwardly thereby disengaging the strip S from the pin 174. If it is necessary during the operation of the machine to shift the height of the upper surface 170, this will be done by causing the cylinder assembly 240 to be extended or retracted, the operation of the cylinder also being controlled by the computer.

While a preferred structure in which the principles of the present invention have been incorporated is shown and described above, it is to be understood that this invention is not to be limited to the particular details shown and described above, but that, in fact, widely differing means may be employed in the practice of the broader aspects of this invention.

What is claimed is:

1. An improved apparatus for measuring the thickness of a coating on a strip of material, which strip moves along a predetermined generally linear path initially past a first location and then past a second location; said apparatus comprising:
    a frame,
    a shuttle mounted on said frame for movement between the first and second locations;
    engaging means carried by said shuttle and capable of engaging the moving strip to cause the shuttle to be moved from the first location to the second location;
    drive means on said frame and capable of moving said shuttle from the second location to the first location;
    measuring means having at least a portion mounted on the shuttle and capable of measuring the thickness of the coating on the strip of material when the shuttle is being moved from the first location to the second location, said portion of the measuring means being held from movement towards and away from the strip of material during measuring;
    support means mounted on said shuttle and capable of supporting the strip of material when the shuttle is being moved from the first location to the second location, said support means having a support surface engaged by said strip of material during measuring; and
    adjusting means on said shuttle and capable of moving the entire support surface towards and away from said portion of the measuring means to establish a spaced-apart predetermined measuring distance between said portion of the measuring means and the coating on a specific portion of the strip of material.

2. The apparatus as set forth in claim 1 wherein said portion of the measuring means is a proportional counter and either an X-ray tube or a gamma ray emitting isotope.

3. The apparatus as set forth in claim 1 wherein the adjusting means includes an adjustable stop assembly.

4. The apparatus as set forth in claim 1 in which said support means is adjustable along said predetermined path.

5. The apparatus as set forth in claim 1 further characterized by the provision of moving means on said shuttle and capable of moving said portion of the measuring means generally parallel to the support surface and generally at right angles to said predetermined path such that said measuring means can measure transversely spaced-apart portions on said strip of material.

6. The apparatus as set forth in claim 5 further characterized by the provision of calibration means disposed in the plane of the coating on said strip and to one side thereof and laying in the path of said portion of the measuring means when moved by said moving means.

7. The apparatus as set forth in claim 6 wherein said portion of the measuring means is mounted on tracks parallel to the support surface and generally at right angles to said predetermined path, and wherein the moving means is a stepping motor and threaded shaft capable of moving said portion of the measuring means along said track.

8. The apparatus as set forth in claim 7 wherein said motor is secured to said shuttle.

9. The apparatus as set forth in claim 5 wherein the support means is movable between two positions of adjustment such that the thickness of coatings on differing height portions of the strip of material can be measured.

10. The apparatus as set forth in claim 9 wherein the support means is spring biased to a first position, a first adjustable stop assembly being provided to establish a first position of adjustment at said first position.

11. The apparatus as set forth in claim 10 wherein said support means can be moved against spring bias to a second position, a second adjustable stop assembly being provided to establish the second position of adjustment.

12. The apparatus as set forth in claim 11 wherein said support means is moved by a single acting air cylinder.

13. The apparatus as set forth in claim 12 further characterized by the provision of a rock shaft extending parallel to the support surface of said support means, a first rock arm secured to one end of said rock shaft, the rock arm carrying a roller engageable with said support means, and further characterized by the provision of a second rock arm on the other end of said rock shaft, said second rock arm being engageable with the rod end of said single acting cylinder, the anchor end of said single acting cylinder being secured to said shuttle.

14. An improved apparatus for measuring the thickness of a coating on a strip of material, which strip moves along a predetermined generally linear path initially past a first location and then past a second location, said apparatus including
    a frame,
    a shuttle mounted on said frame for movement between the first and second locations,
    engaging means carried by the shuttle and capable of engaging the moving strip to cause the shuttle to be moved from the first location to the second location, disengaging means carried by said shuttle and capable of engaging the moving strip to cause the moving strip to become disengaged from the shuttle at the second location, drive means on said frame and capable of moving said shuttle from the second location to the first location, and measuring means having at least a portion mounted on the shuttle at a location spaced away from the coating to be measured, the measuring means being capable of measuring the thickness of the coating on the strip of material when the shuttle is being moved from the first location to the second location;

wherein the improvement comprises:

support means mounted on the shuttle and having a generally planar support surface capable of supporting the strip of material when the shuttle is being moved from the first location to the second location;

wherein said portion of the measuring means mounted on the shuttle is a proportional counter and either an X-ray tube or a gamma ray emitting isotope;

adjusting means on the shuttle and capable of moving the entire support surface towards and away from the portion of the measuring means to establish a spaced-apart predetermined measuring distance between the portion of the measuring means and the coating on a specific portion of the strip of material; and moving means on the shuttle and capable of moving the portion of the measuring means generally parallel to the generally planar support surface and generally at right angles to the predetermined path of the strip such that the measuring means can measure transversely spaced-apart portions on the strip of material.

15. The apparatus as set forth in claim 14 wherein the adjusting means includes two spaced-apart movement limiting stop assemblies and further including actuators capable of moving the support means into abutment with either of said stop assemblies.

16. An apparatus for measuring the thickness of a coating on a strip of material, which strip moves along a predetermined generally linear path initially past a first location and then past a second location; said apparatus including;

a frame;

a shuttle mounted on said frame for movement between the first and second locations;

engaging means carried by the shuttle and capable of engaging the moving strip to cause the shuttle to be moved from the first location to the second location;

measuring means having at least a portion mounted on the shuttle and capable of measuring the thickness of the coating on the strip of material when the shuttle is being moved from the first location to the second location; and drive means on said frame and capable of moving said shuttle from the second location to the first location, said drive means including spaced apart drive and idler sprockets, a chain passing over said sprockets, a saddle block, a pair of pins passing through the ends of the chain and said saddle block to secure the saddle block to the chain, a drive pin secured to said saddle block, a yoke in which a portion of the drive pin is journaled, and bracket means secured to said shuttle and capable of supporting said yoke for vertical shifting movement.

* * * * *